United States Patent [19]

Sire

[11] 3,825,853

[45] July 23, 1974

[54] AMPLIFIER TUBE FOR POWER AMPLIFICATION

[75] Inventor: Gérard Sire, Paris, France

[73] Assignee: Thomson-CSF, Paris, France

[22] Filed: Dec. 1, 1972

[21] Appl. No.: 311,151

[30] Foreign Application Priority Data

Dec. 6, 1971 France .............................. 71.43710

[52] U.S. Cl. ...................................... 330/53, 330/56

[51] Int. Cl. .............................................. H03f 3/60

[58] Field of Search ............. 330/56, 207 P; 315/39

[56] References Cited

UNITED STATES PATENTS 2,637,780 5/1953 Longacre ............................ 333/13

3,381,166 4/1968 Gerlach ............................ 330/56 X

*Primary Examiner*—Nathan Kaufman

*Attorney, Agent, or Firm*—Cushman, Darby & Cushman

[57] ABSTRACT

An amplifier tube for power amplification comprises a protection device against self-oscillation of the kind which develop in a cavity of the amplifier tube.

This device comprises waveguides coupled at one end to this cavity and having such cross-section dimensions that they form short-circuits at the frequencies of operation of the amplifier tube and act as a trap at the frequency of the self-oscillation. The guides may be located outside the cavity, if the location thereof makes this possible; they may also be provided in the plunger of the cavity.

2 Claims, 4 Drawing Figures

AMPLIFIER TUBE FOR POWER AMPLIFICATION

The present invention relates to an amplifier tube which is protected against self-oscillation of the kind liable to occur at frequencies above 100 Mc/s, for example,.

In the case of UHF power amplifiers, chosen here by way of example, the tendency on the part of the amplifier tube to develop self-oscillation in the cavities associated with it, is a source of extreme nuisance; in other words, the self-oscillation, by localising the energy at certain points in the cavities, lead to rapid destruction of the material. The problem is a crucial one in UHF high power amplifiers, in view of the power levels involved.

The frequency of self-oscillation of a UHF tube depends upon the dimensions of its electrodes; in the tetrodes generally utilised in UHF amplifiers, it is a function of the mean circumference of the screen-grid.

Various solutions to this problem have been put forward, and these consisted in particular in introducing wave traps into the cavity or cavities where there was a risk of the development of self-oscillation. But this leads to devices whose mechanical design is complicated, and the adjustement of which is lengthy and non-reproducible from one amplifier to another; because of their bulk and position in the cavity these devices interfere with the displacement of the tuning plunger, thus reducing the pass band of the amplifier; in addition their cost is comparatively high.

The object of the present invention is an amplifier tube, the self-oscillation protection device of which does not exhibit the aforesaid drawbacks.

According to the invention, there is provided an amplifier tube for power amplification comprising a cavity with a device for protection against self-oscillation at a frequency $F_0$ higher than the operating frequency band of this tube and higher than 100 Mc/s, said device comprising three waveguides having respective first and second ends, each of said waveguides having its first end coupled to said cavity and having a cut-off frequency $F_1$ where $F_1$ is a given frequency comprised between said operating frequency band and said frequency $F_0$, and wherein said three waveguides are positioned at 120° from each other around said cavity.

Other features will become apparent and the invention better understood, from a consideration of the ensuing description and appending drawings in which:

In these drawings, corresponding elements have been given the same references.

FIG. 1 illustrates a schematic half-section through a UHF tetrode and its associated cavities, the section being taken in a plane passing through the axis X—X of the tetrode.

Figure 1:
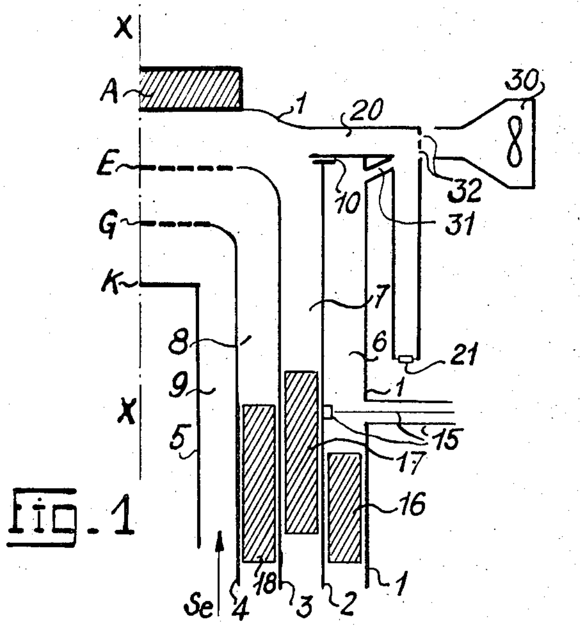
FIG. 1 is a schematic sectional illustration of the tube, in accordance with the invention.

In this drawing, the anode 1 and the screen-grid E, the control grid G and the cathode K of the tetrode, can be seen. Metal walls, 1, 2, 3, 4, 5 define concentric cavities marked 6, 7, 8 and 9. The walls 1, 2, 3, 4, and 5 are respectively connected to the anode, the screen-grid, the control grid and the cathode of the tetrode. The cavity 9 between the walls 4 and 5, forms the input cavity of the system illustrated, and the input signal for amplification, marked by the arrow $S_e$, is applied thereto. The tuning plunger has been omitted in order not to overburden the drawing.

The cavity 8 comprised between the walls 3 and 4, is the neutralization cavity and it contains a tuning plunger 18.

The cavity 7 which constitutes the anode or primary cavity, is between the walls 2 and 3 and has a tuning plunger 17.

The cavity 6, known as the output or secondary cavity, is coupled to the cavity 7 through a window 10 filled with mica, not shown, the dimensions of which window determine the coupling coefficient. The cavity 6 comprises a tuning plunger 16, likewise. The output cavity 6 being tuned to the carrier frequency $F_p$, the energy at the carrier frequency $F_p$ is the only one which is transmitted from the anode cavity to the output cavity, and there is no risk of this latter being disturbed by a wave at the self-oscillation frequency. The output circuit constituted by the two cavities 6 and 7, on the other hand, makes it possible to reduce the selectivity of the circuit through the coupling between these two resonant cavities. The cavity 6 supplies the amplified output signal to an output element 15 whose coaxial cable and whose control and matching systems, have been symbolised in the drawing.

In the amplifier tube of FIG. 1, the protection device is formed by three waveguides, only one of which, 20, may be seen in the drawing, its bent shape is due solely to the need to give the assembly a reduced volume. This waveguide opens at one of its ends into the cavity 7 in the neighbourhood of the anode lead, and at the opposite end a resistor 21 is connected, the function of which will be indicated hereinafter.

A fan 30 blows air into the waveguide through orifices 32 whose dimensions are small compared with those of the transverse section of the waveguide; this air on the one hand ventilates the cavity 7 and the cavities 8 and 9 as well as the electrodes of the tube, and on the other hand ventilates the cavity 6 through ducts such as those marked 31, the ends of which open respectively into the cavity 6 and into the waveguide 20 and the transverse cross-sectional areas of which are small compared with that of the waveguide 20.

Figure 2:
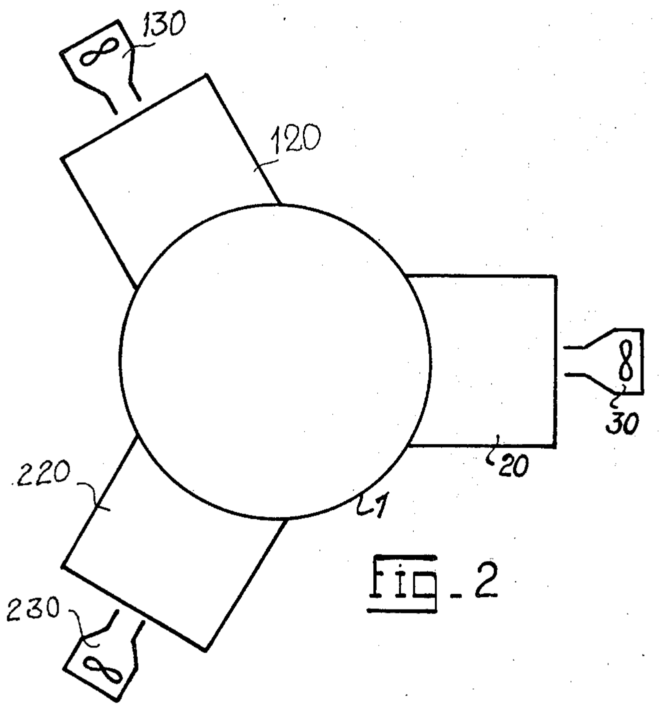
FIG. 2 illustrates the protection device of FIG. 1 in plan.

FIG. 2 illustrates a plan view of the waveguide 20 of FIG. 1, as well as of the two other similar waveguides 120 and 220; these three waveguides, positioned at 120° from each other, are fixed to the wall 1 only the outline of which in the plane of the drawing has been shown; this drawing also illustrates the position of three fans 30, 130 and 230, respectively associated with the guides 20, 120 and 220 and which produce forced draughts through the tube and its cavities.

The explanation of the operation of the circuit just described, will be made with the help of the concrete case of UHF power amplifier stage equipped with a THOMSON-CSF TH 491, 25 kw maximum power, tube. This tube has a self-oscillation frequency $F_0$ at around 1,500 Mc/s, that is to say at a wavelength of around 20cm. In the circuit described the TH 491 tube is designed to produce about 20 kw and the carrier frequency $F_p$ is 830 Mc/s representing a wavelength of 36 cm. Each of the waveguides has a transverse section such that its cut-off wavelength is longer than the corresponding wavelength for $F_o$, and shorter than the wavelength corresponding to $F_p$, that is to say that its large side, located in a plane perpendicular to the plane of the drawing, is between 20/2 = 10 cm and 36/2 = 18 cm; it therefore passes waves of frequency $F_o$ and virtually acts as a short-circuit for waves of frequency $F_p$. Moreover, the waveguides have a sufficient length to attenuate any carrier frequency wave.

The resistor 21 in the example described, has a resistance of 47 Ohms rated at 2w; it is designed to act as a load for any wave at frequency $F_o$; in fact measurement shows that the trap is sufficiently effective for the resistor not to be absolutely necessary.

The system of FIG. 1 shows, in particular, that despite the protection device the tuning plunger 17 can be arranged very high in the cavity 7 so that the passband is wide and the amplifier stage has a high efficiency. The protection device described has also been experimented with THOMSON-CSF tubes TH 491, 25kw and TH 290, 10 kw, at carrier frequencies of 560 Mc/s and more, the plunger 17 being adjusted to tune the system to 3λ/4. For these same tubes, but considering carrier frequencies of between 470 and 560 Mc/s, enabling the plunger of the anode cavity to be tuned to λ/4; the UHF amplifier comprises two protection devices one for the anode cavity and one for the neutralization cavity, both operating in the same way and on the same principle as that set out in FIGS. 1 and 2, but located differently in relation to the tube and the concerned cavity, as shown in FIGS. 3 and 4.

Figure 3:
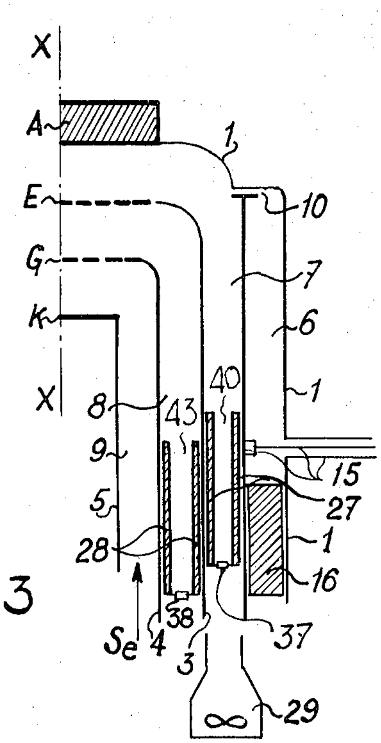
FIG. 3 illustrates another embodiment in accordance with the invention.
Figure 4:
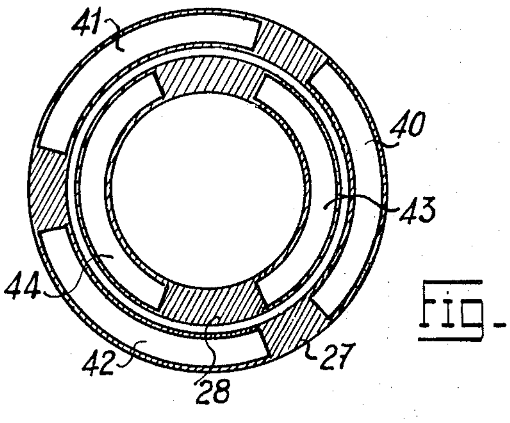
FIG. 4 illustrates the protection device of FIG. 3, in plan.

FIG. 3 provides a half-section, in the same way as FIG. 1, of the anode A, the screen-grid E, the control grid G, and the cathode K of a tetrode whose associated cavities 6, 7, 8, 9 are limited by the walls 1, 2, 3, 4, 5. The cavities 6, 7, 8 each contain a tuning plunger, respectively marked 16, 27 and 28. The cavity 6 is coupled to cavity 7 by a window 10 containing a mica plate, not shown. A coaxial cable with its control and matching system, marked schematically at 15, picks up the power from the cavity 6 and transmits the output signal corresponding to the input signal $S_e$ of carrier frequency $F_p$ applied to the cavity 9, the latter cavity having been shown without its plunger.

Each one of the two plungers 27 and 28 comprises a number of hollow portions forming as many waveguides whose sections are designed so that those of their openings located at the end adjacent the tube, constitute a short-circuit for a wave at the carrier frequency $F_p$ but pass a wave at the self-oscillation frequency $F_o$, it being understood of course that $F_o > F_p$. In the drawing only the waveguides 40 and 43 respectively provided in the plungers 27 and 28 may be seen.

As in the waveguide 20 of FIG. 1, resistors 37, 38, of 47 ohms and rated at two watts, provide a dissipative load for any wave which should develop at the self-oscillation frequency $F_o$; those resistors are connected at the ends of the plungers opposite to the electrodes of the tube.

Moreover, the waveguides formed in plunger 27 are used to effect forced ventilation of the tube-cavity assembly, by means of fans such as fan 29 which blows air through the waveguide 40, the air being for the most part discharged through the waveguides formed in plunger 28.

It should be noted, too, that a plunger forming waveguides of suitable section, may likewise be used for the neutralization cavity in the example of FIG. 1 instead of the solid piston 18; the function of this plunger is on the one hand to add its anti-oscillation effect to that of the waveguides 20, 120 and 220, and on the other hand to effect proper discharge of the air delivered by the fans 30, 130 and 230.

FIG. 4 illustrates the two plungers 27, 28 in plan, in the respective positions they occupy in the cavities; the example illustrated corresponds to that of plunger for the cavities of a THOMSON-CSF TH 491 tube amplifying a signal of carrier frequency 520 Mc/s; the dimensions of the cavities associated with this tube and the wavelengths corresponding to the carrier frequency (about 58 cm) and to the self-oscillation frequency, have led to the design of an anode cavity plunger with three waveguides 40, 41, 42, and a neutralization cavity plunger with two waveguides 43, 44.

The distributed constant elements used in the protection device can be either waveguides or cavities or lines.

Of course, the invention is not limited to the embodiments described and shown which were given solely by way of example.

What is claimed is:

1. An amplifier tube for power amplification comprising a coaxial cavity with a device for protection against self oscillation at a frequency $F_o$ higher than the operating frequency band of this tube and higher than 100 Mc/s, said device comprising three waveguides having respective first and second ends, each of said waveguides having its first end coupled to said cavity and having a cut-off frequency $F_1$ where $F_1$ is a given frequency comprised between said operating frequency band and said frequency $F_o$, and wherein said three waveguides are positioned at 120° from each other around said cavity.

2. An amplifier tube as claimed in claim 1, comprising three dissipative loads respectively connected to said second ends.

* * * * *